United States Patent [19]

Miller

[11] 3,891,811

[45] June 24, 1975

[54] WIRE PAIR IDENTIFICATION SYSTEM

[75] Inventor: Arthur O. Miller, Dallas, Tex.

[73] Assignee: Hewlett-Packard Company, Palo Alto, Calif.

[22] Filed: Aug. 16, 1973

[21] Appl. No.: 389,011

[52] U.S. Cl. .............................. 179/175.3 A; 324/66

[51] Int. Cl. .............................................. H04b 3/46

[58] Field of Search ................ 179/175.3 A, 175.25; 324/66

[56] References Cited

UNITED STATES PATENTS

| | | | |
|---|---|---|---|
| 3,252,088 | 5/1966 | Palmer | 179/175.3 A |
| 3,288,943 | 11/1966 | Bohnenblust | 179/175.3 A |
| 3,288,944 | 11/1966 | Fleming | 179/175.3 A |
| 3,401,238 | 9/1968 | Williams et al. | 179/175.3 A |
| 3,627,932 | 12/1971 | Garrett et al. | 179/175 |
| 3,742,350 | 6/1973 | White | 324/66 |

*Primary Examiner*—Kathleen H. Claffy
*Assistant Examiner*—Douglas W. Olms
*Attorney, Agent, or Firm*—Patrick J. Barrett

[57] ABSTRACT

An automatic conductor pair identifier utilizes a field unit under the control of an operator and an office control unit coupled to a multiwire cable of wire pairs to be identified. Upon actuation of the field unit by an operator, a frequency tone signal is transmitted over a randomly selected wire pair to the office control unit that responds thereto to transmit a pulse code representing a number identifying the wire pair over the same wire pair. This pulse code is received by the field unit and converted into a digital display for operator evaluation. Basically, the field unit comprises an oscillator coupled to a transmitter for generating the inquiring frequency signal. A pulse code is received in the field unit by a level detector/receiver coupled to logic circuitry for decoding the pulse code to drive a units display and and a tens display as part of a digital readout. In the office unit, there is also a receiver and level detector coupled to logic circuitry for responding to an inquiring frequency signal to set up a counting sequence. Upon positively identifying an inquiring frequency signal, the logic circuitry actuates a transmitter coupled to an oscillator for transmitting the pulse coded to the field unit over the same wire pair used by the field unit.

56 Claims, 6 Drawing Figures

WIRE PAIR IDENTIFICATION SYSTEM

This invention relates to automatic conductor pair identification apparatus to identify conductor pairs in a multiconductor cable, and more particularly to a single operator automatic conductor pair identification apparatus not requiring a previously identified control pair.

Cables employed for communication purposes, composed of a plurality of pairs of conductors arranged in a predetermined numerical order, are in common use. In assembling these cables to the equipment with which they are to be employed, it is common practice to connect the individual conductors in a predetermined sequence to terminals assembled on a main distributing frame disposed in a central office telephone exchange. The individual cable pairs are then identified at the remote end of the cable by an attendant thereat ascertaining the pair in which a signal tone has been impressed by a frame attendant at the telephone exchange, the numerical relationship between pairs being determined by instructions given between the attendants over a control pair in the cable, in this case, a "talking pair."

Each of the conductor pairs connects a particular subscriber to a terminal on the main distributing frame at the central office. Also, the cables may be spliced in tandem to constitute a continuously long cable in which the pairs of one cable are joined to the pairs of the succeeding cable section. In either event, it is imperative that the discrete conductor pairs at the opposite ends of the cable be connected to previously assigned equipment located thereat. To achieve this, it is necessary to employ suitable testing apparatus to assure that each twisted pair is properly identified at the opposite cable ends.

Identification of the conductor pairs is, at present, conducted manually. The two workmen, as mentioned above, are stationed, respectively, at the central office and the field end of the cable. The man in the central office supplies an audible signal to each of the conductor pairs. He communicates the identity of each identified pair to the man in the field at the time the signal is applied by means of a control pair. The man in the field has an electrical plug connected to an audio detector. As the man in the field is informed of the identity of an energized pair, he manually scans the conductor pairs of the cable to find the energized pair. When located, he puts an identification marker on that pair and notifies the man in the central office of the identification, again over the control pair in the cable. This procedure is continued until all the conductor pairs have been identified.

Recently, there has been considerable activity in developing an identification system that permits a single operator to identify the conductor pairs. Such a system usually comprises some dial or pulse controlled electromechanical selecting means to allow the operator at the field location of the multiconductor cable to selectively apply signal tones at the central office to any conductor pair in the cable. The operator then manually scans all the conductor pairs in the field end of the cable until he locates the one that is energized.

Heretofore, wire pair identification systems were considered to be either too slow and cumbersome or else required the operator to perform a large number of duties in the operation of fairly complicated equipment with a high probability of error. These systems all require the use of a previously selected control pair that in most cases is a time consuming procedure. In many situations, such identifying systems cannot be used because all wire pairs in a cable are in use and a control pair cannot be identified. The present invention identifies individual conductor pairs automatically with a minimum of skill, effort and time required on the part of an operator.

In accordance with the present invention, a system for remotely identifying individual wire pairs of a multipair cable comprises control means electrically connected to each individual wire pair of the multipair cable for sequentially scanning the pairs for a frequency signal; the control means then generates an identifying code in response thereto. Further, the system includes test means electrically connected to individual wire pairs of the multipair cable, the test means including means for transmitting the frequency signal over a selected individual wire pair to the control means. In addition, the test means includes means for receiving from the control means over the same wire pair that a frequency signal had been previously transmitted, the identifying code and for converting the identifying code into a numerical display representing an individual wire pair.

While the invention has specific application to the telecommunications industries in the areas of identification of specific wires or wire pairs of a multipair cable, verification of large numbers of wiring terminations on newly installed work, and verification of telepone numbers terminated on a main distribution frame from a remote station, the invention also has application to other industries involving large electrical wiring operations. Representative of these additional applications are ships, aircraft, large building construction, and burglar alarm systems, eacch requiring multipair cables for interconnecting various sytem components.

A more complete understanding of the invention and its advantages will be apparent from the specification and claims and from the accompanying drawings illustrative of the invention.

Referring to the drawings.

Figure 1:
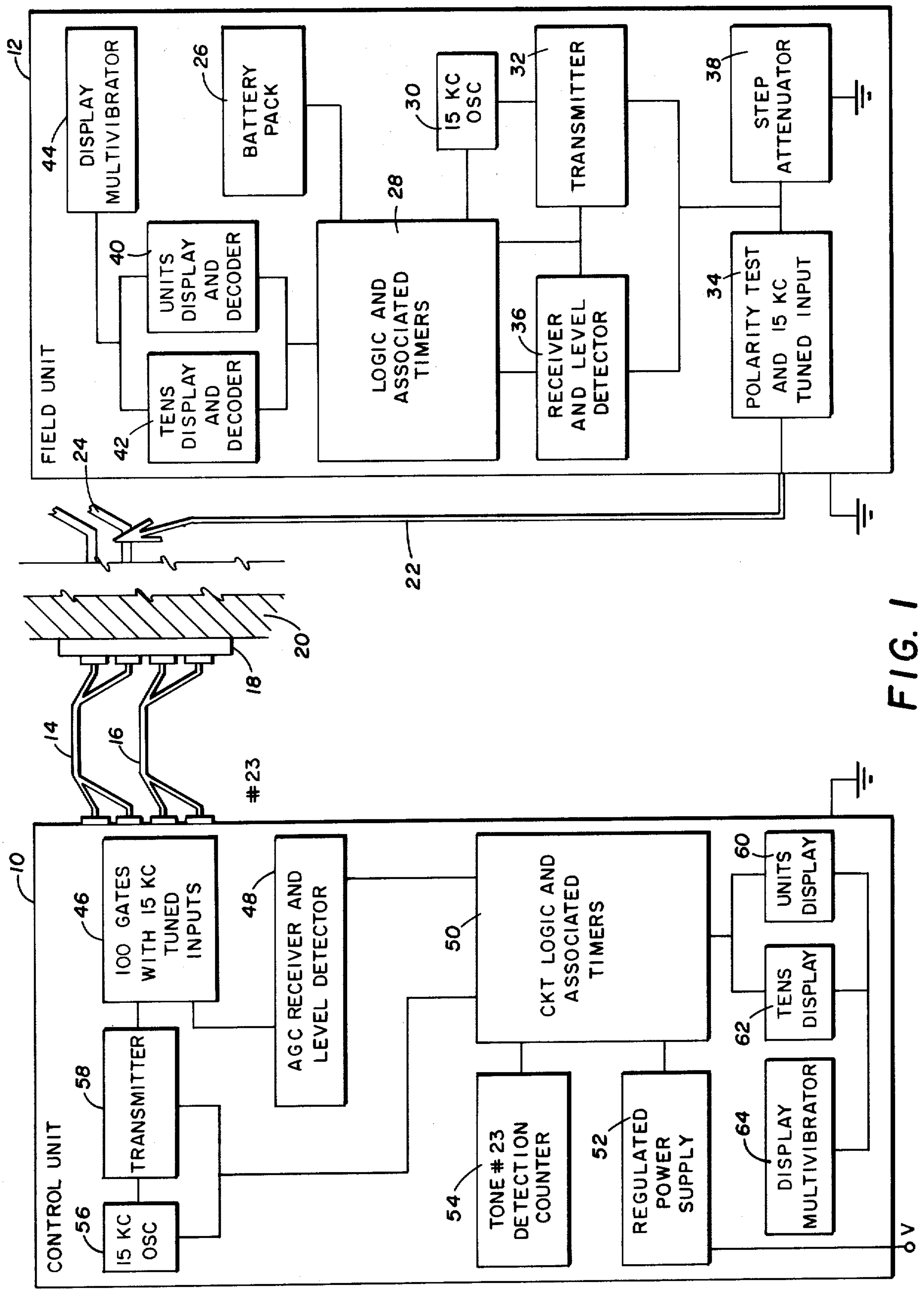
FIG. 1 is a block diagram of an office control unit interconnected through wire pairs to a field unit, also shown in block diagram.

Referring to the drawings, the wire identification system of the present invention consists of two parts; a control or central office unit 10 and one or more field test units 12. When used to identify wire pairs, the control unit 10 is coupled to up to 100 pairs of wires in a central office exchange by means of connector cords 14 and 16 and clamp-on connectors 18 tied to a wire frame 20 in the central office exchange. In accordance with standard telecommunications systems, the frame 20 comprises the termination of wire pairs of a distribution system.

The field test unit 12 can be utilized at any point along a cable to identify wire pairs. An operator of the field unit attaches a test cable 22 to a selected wire pair, such as pair 24, and by actuating a push button the correct number and polarity of the pair 24 as identified on the frame 20 can be determined.

The field unit includes a self-contained power supply such as a battery pack 26 supplying an energizing voltage to a logic network and associated timers 28. Also coupled to the logic 28 is a 15 KHz oscillator 30 for generating the tone frequency transmitted to the office unit 10. This tone frequency, as generated by the oscillator 30, is applied to a transmitter 32 and through an input network 34 to the test cable 22. Incoming signals to the field unit 12 are also transmitted thorugh the network 34 to a receiver and level detector 36 and a step attenuator 38. These received signals comprise a pulse code of the identifying number for the wire pair 24. This pulse code is transmitted from the receiver 36 into the logic network 28 and from the logic network 28 to a units display and decoder 40 and a tens display and decoder 42. The display and decoders 40 and 42 convert the pulse codes into a digital display for operator use. Driving the display and decoders 40 and 42 is a multivibrator 44.

An inquiring tone frequency transmitted over the wire pair 24 is applied to one of 100 signal gates arranged in a network 46. Each of these 100 signal gates is sequentially coupled to a receiver/level detector 48 and the tone frequency is then applied to the input of a logic network and associated timers 50. Power for driving the logic network 50 and the entire office unit 10 is provided by a regulated power supply 52 coupled to a standard 115 volt alternating current supply.

Connected to the logic network 50 is a tone detection counter 54 that has a number of count positions equal to the number of wire pairs connected to the signal gates 46. Operation of the tone detection counter will be subsequently explained. Upon identifying the number of the wire pair 24, the logic network 50 provides a signal to couple a 15 KHz oscillator 56 to a transmitter 58. The transmitter 58 and the oscillator 56 are keyed to the logic network 50 to produce a pulse code through the signal gates 46 identifying the number of the wire pair 24. This pulse code is then transmitted over the same wire pair 24 to the field unit 12.

Also included in the office unit 10 is a units display 60 and a tens display 62 coupled to the logic network 50. The displays 60 and 62 are energized from a display multivibrator 64.

Figure 2:
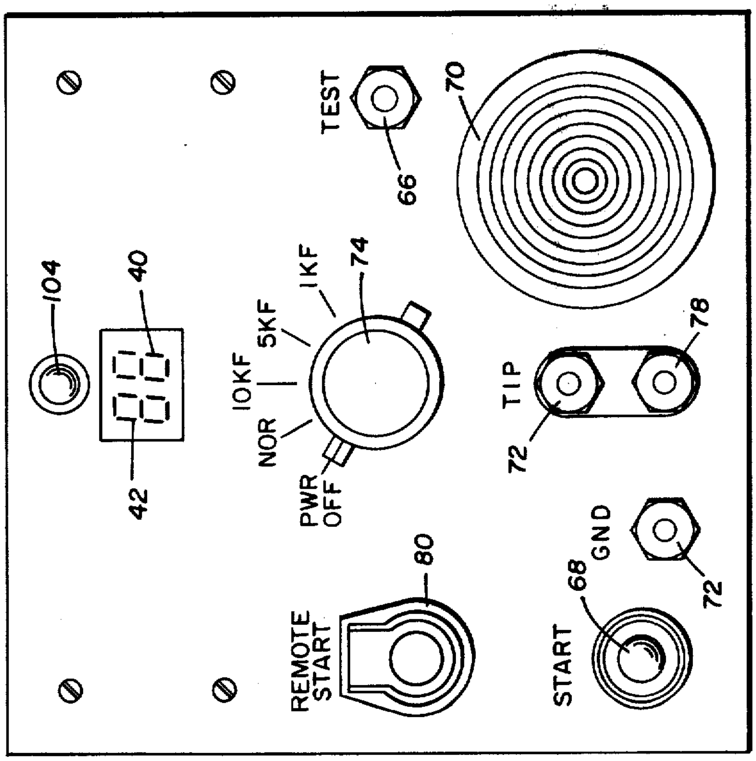
FIG. 2 is a pictorial diagram of an operator's control panel for the field unit showing a digital display for visual identification of a wire pair.

Referring to FIG. 2, there is shown an operator's control panel for the field unit 12 including the units display 40 and the tens display 42. Before using the field unit 12 to identify wire pairs, a test of the major circuits and battery condition is made by momentarily depressing both a test button 66 and a system start button 68. If the set is functioning properly, both display units 40 and 42 will light for approximately 5 seconds indicating 00 and an audible alarm 70 will sound for approximately 1 second. The battery condition is evaluated by observing the brilliance of the display units.

To use the field unit for wire pair identification, an operator connects a ground terminal 72 to either a good earth ground or a lead shield (if available) of the cable to be tested. Next, the operator selects one of four ranges on a range/adjust step attenuator 38 switch 74 that also includes an on/off switch for connecting the battery pack 26 to the circuitry. Depending on the cable length from the field unit 12 to the control unit 10, the switch 74 is adjusted to one of four positions. The first position clockwise from power off is the normal operating position of the unit and enables the identification of wire pairs for up to 50,000 feet of cable length. Preceding in a clockwise direction, the remaining three positions are for wire pair identification at 10,000, 5,000 and 1,000 feet, respectively.

After adjusting the range into switch 74, the wire pair to be identified is coupled to the field unit 12 by means of the test cable 22 having one wire connected to a tip jack 76 and a second wire connected to a ring jack 78. Also as part of the operator's control panel is a remote start connector 80 for accepting a cable equipped with a remote start button.

Assuming that the office control unit has been previously connected to a multipair cable including the wire pair 24, identification of this wire pair is initiated by depressing the start button 68. Depressing the start button sequences the field unit 12 to its first mode of operation, that is, the transmit mode. Additional modes of operation for the field unit 12 are the receive mode and display mode all of which are under control of a seven state sequencer as part of the network 28. In the transmit mode, the field unit 12 operates asynchronously as there is no communication channel to the control unit 10 at this time. Initially when in the transmit mode, a frequency tone (e.g., 15 KHz) is sent to the office unit 10 over the to be identified wire pair 24 which is one of the multiple pairs in the cable being scanned by the office unit through the signal gates 46. When the wire pair 24 is found, the office unit 10 stops scanning and sequences from a scan mode to a transmit mode to send information back to the field unit 12. At the end of a preset time after the tone frequency, the field unit goes into the receive data from the office unit within a preselected time period. At this time, the field unit 12 operates synchronously with the office unit 10 using the data received over the now established communicating channel, namely the wire pair 24. As long as the field unit is in the receive mode, it is under control of the office unit 10.

While in the receive mode, a pulse code representing the identification of the wire pair 24 is transmitted by means of the transmitter 58 to the control unit 10 to the receiver 36 of the field unit 12. After the last bit of data has been received, the field unit shifts into the display mode. Here the pulse code is transmitted through the logic network 28 into the display and decoder units 40 and 42 and a visual representation of the identification number for the wire pair 24 is presented to the operator. In addition, the alarm 70 is sounded if the pair being identified has a polarity reversed from an established electron flow. The reverse polarity feature will be explained in greater detail. The display mode is timed to last for about 1 second and then the entire unit shuts off. If the operator has not observed the identification as displayed, he may reactivate the system by again depressing the start button 68. This repeats the operating sequence of the field unit 12.

Referring to the operation of the office control unit 10, there are no controls or adjustments to be made during the operation for identifying wire pairs. After energizing the system by connecting the regulated power supply 52 to a source of energizing voltage, the office unit 10 is coupled to a multipair cable by means of the cords 14 and 16. With power applied, the office unit 10 is sequenced to the scan mode which is the initial or normal mode. Two additional modes of operation for the control unit 10 are the sync mode and the transmit mode. The office unit remains in the scan mode until a frequency tone signal of the correct duration is received through one of the signal gates 46. This transfers the unit 10 to the sync mode which is a transient state to be maintained only as long as the frequency tone signal persists. Upon termination of the frequency tone signal, the unit 10 switches to the transmit mode and remains in this mode until all data has been sent to the field unit 12, after which it returns to the scan mode.

Control unit 10 operates asynchronously, timewise, as there is no link between it and the field unit 12 when operating in the scan mode. It sequentially samples each of the wire pairs connected to it, looking for the frequency tone signal. When the field unit 12 transmits a frequency tone on one of the cable pairs, the control unit 10 detects its presence. The frequency tone detector as part of the network 48 is preceded by an automatic gain controlled (AGC) amplifier having fast attack and extremely small decay, thus holding the value of the signal in the form of a gain reduction. This means that in order for the detector to yield an output again upon receipt of another signal, a signal of equal or greater amplitude must be sampled. The scanning process continues and as stronger signals are encountered, the amplifier's gain is reduced accordingly, until at last the strongest pair is reached.

A feature of the present invention is that a wire pair is identifiable even though considerable cross-talk exists between adjacent wire pairs in a cable arrangement. Further, the system will identify a wire pair even though different power levels exist in the multipair cable. This ability is achieved by utilization of a level detector in combination with an automatic gain controlled receiver.

In an asynchronous system such as the office unit 10, there is no fixed starting and stopping points in time and a pair to be identified could be any one of the 100 pairs connected to the signal gates 46. To detect when a valid frequency tone signal is detected the tone detector counter 54 is utilized. The first time the detector of the network 48 produces an output, it enables the counter 54 and starts a timer in the network 50. the counter is incremented by 1 each time the timer advances the scanning sequence to the next wire pair (i.e., the next signal gate 46). This sequencing is completed by sequentially controlling the gate closure to the individual wire pairs. Should the detector of the network 48 produce a second output before the counter recycles to its starting position, the logic network 50 resets the counter 54 to zero and recycles the timer. Whenever a stronger signal is received at the detector of the network 48, the detector gives an output, thereby resetting the counter and by definition there can be no stronger previous signal and the scanning sequence must step through each wire pair in order to return to this wire pair. Thus, the counter is incremented and when the strongest pair is reached a second time the control logic 50 stops the scanning process.

Note, that the actual physical pair identifying number is not given by the detector 54. When the scanning process halts, the gate associated with the wire pair remains open for the duration of the frequency tone signal being received. A simple timing test is made for a preselected time period to verify the validity of the tone and at the end of this time period the office unit 10 sequences to the sync mode.

The office unit 10 remains in the sync mode until the frequency tone signal ceases at which time it sequences into the transmit mode. In this mode, the scanning process is inhibited, the oscillator 56 is turned on, and the transmitter 58 enabled by signals from the logic network 50. The actual physical pair number is now transmitted to the field unit 12 in the form of frequency tone bursts over the same wire pair 24 that the original frequency tone was received by the unit 10. Also in the transmit mode, a polarity test is made on the wire pair being identified and the results of this test are also sent to the field unit in the form of a pulse code. When the last data bit is transmitted, the office unit 10 sequences to the scan mode and continues in the scan mode, as previously described.

Figure 3:
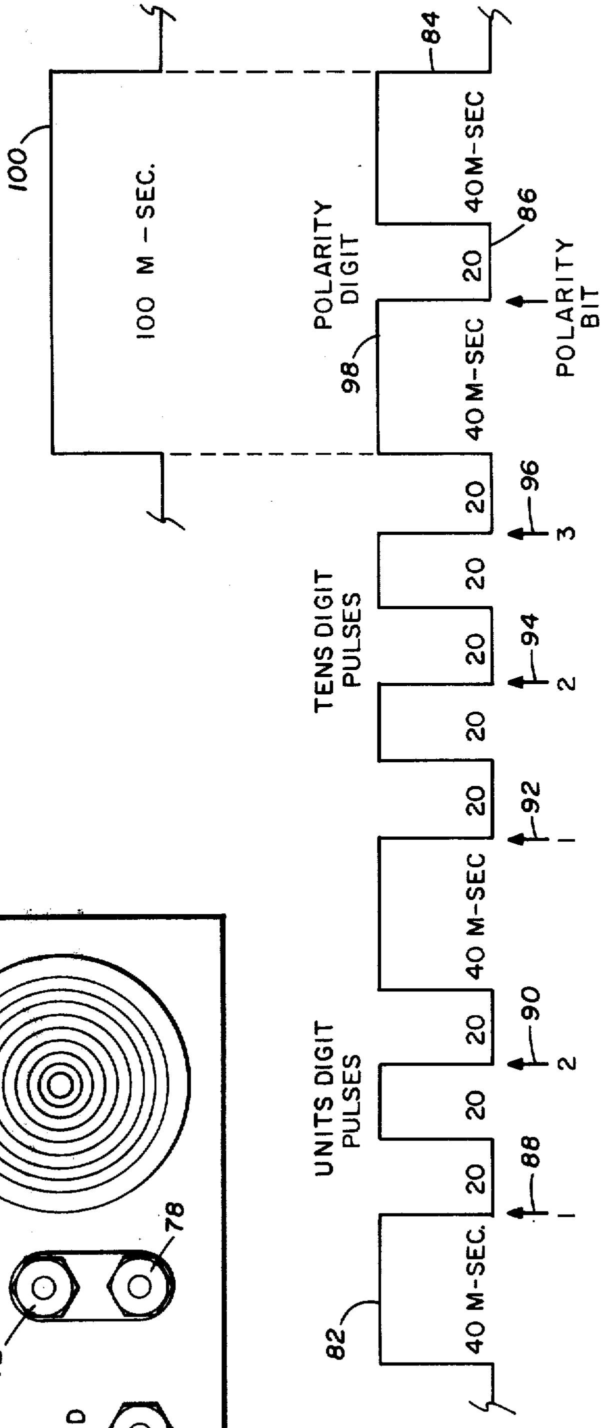
FIG. 3 is a pulse diagram of a typical data format generated by the office control unit for transmission to a field unit for wire pair identification.

Referring to FIG. 3, there is shown the data format for identifying wire pair number 32 as transmitted as a pulse code to the field unit 12. A further feature of the present invention is that both the field unit 12 and the office unit 10 transmit signals at the same frequency. Since only one frequency is used, data is transmitted by the office unit 10 one bit at a time, or serially. In order to distinguish one digit from another, timing pulses are interjected between them. The interdigital timing pulses are, for example, 40 milliseconds long, while the digit pulses are 20 milliseconds long with a 20 millisecond space between subsequent pulses. In addition, there is a 40 millisecond pulse 82 preceding the first digit, and a 40 millisecond pulse 84 following the polarity bit 86. A pulse is represented by a frequency burst and the space between pulses is the absence of the frequency burst.

With specific reference to FIG. 3, the field unit 12 counts digit pulses on the falling edge as indicated by the numbered arrows. The arrows 88 and 90 are decoded as units digit pulses and the falling edges indicated by the arrows 92, 94 and 96 are decoded as the tens digit pulses.

As indicated in FIG. 3, the office unit 10 detected a correct polarity for the identifying wire pair as indicated by the polarity bit arrow. If the office unit detects a reverse polarity for the identified pair, the third and fourth interdigit timing pulses 98 and 84 are replaced with a solid 100 millisecond pulse 100.

Figure 4:
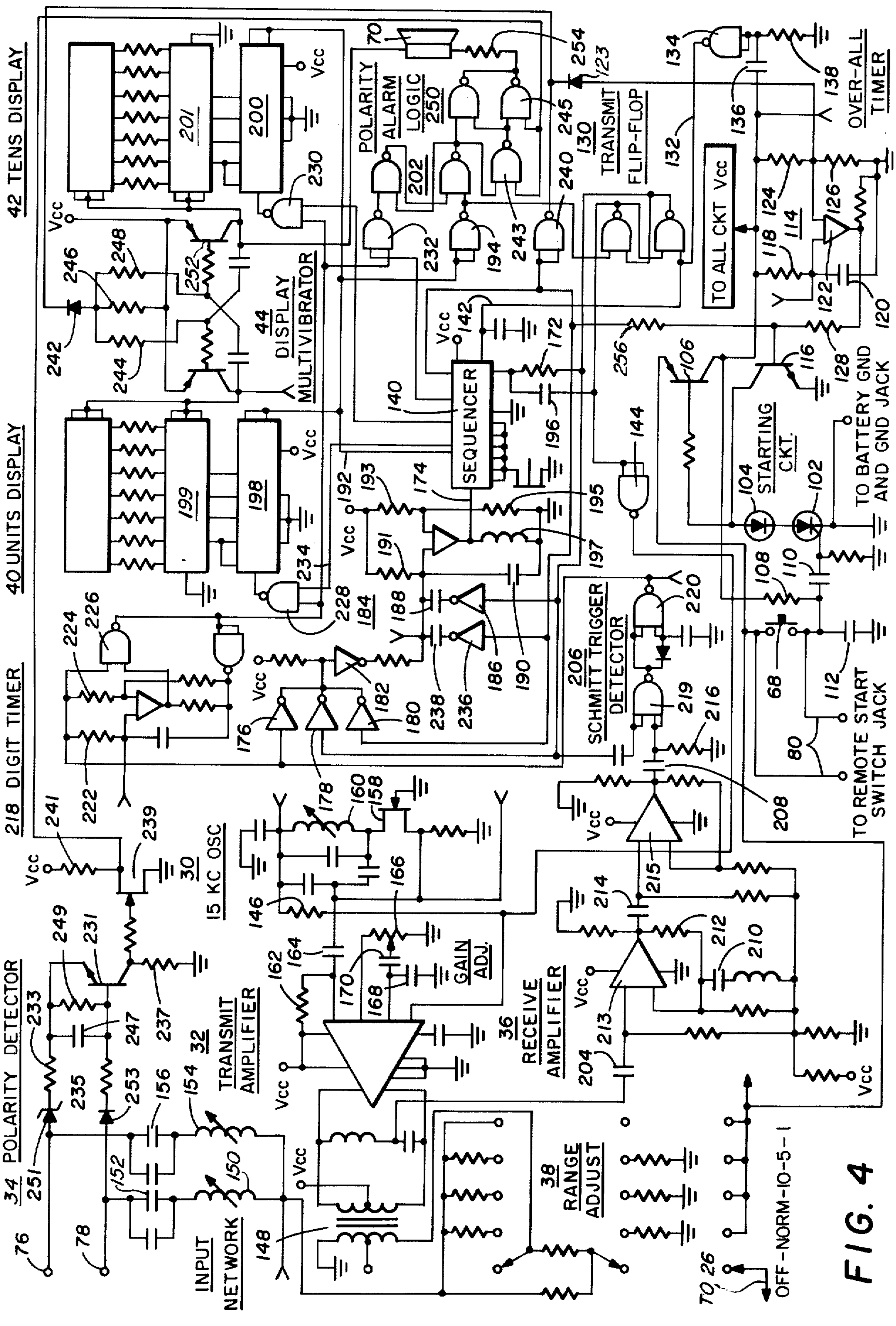
FIg. 4 is a schematic diagram of the field unit of FIG. 1.

Referring to FIG. 4, there is shown a schematic of the field unit 12 wherein actuating the start switch 68 produces a positive pulse applied to the gate of a silicon controlled rectifier 102. This causes a "power on" indicator light emitting diode 104 to be energized and also turns on a transistor 106 that functions as a switch to supply power to all circuits of the field unit. The light emitting diode 104 is physically positioned on the front plate of the field unit between the displays 40 and 42.

Applying power to the circuit through the transistor switch 106 from the battery pack 26 through the switch 38 causes four operations to be completed. First, the starting circuit is disabled by a voltage across a resistor 108 maintaining a charge on capacitors 110 and 112. This operation disables the start switch 68 and prevents noise from interfering with the identification sequence. Second, a timer 114 is actuated to start a time period within which the identification sequence must be complete or the unit automatically shuts down. If data is not received, operation of the timer 114 turns on a transistor 116 which turns off the silicon controlled rectifier 102.

With regard to the timer 114, actual timing is accomplished by a resistor-capacitor combination including a resistor 118 and a capacitor 120. The resistor-capacitor combination operates in conjunction wth a unijunction transistor amplifier 122 having a gate connected to the junction of the resistor 118 and the capacitor 120. The anode of the transistor 122 is supplied by divider resistors 124 and 126. The base of transistor 122 is connected to transistor 116 through a resistor 128. Operation of the timer 114 is in accordance with usual unijunction transistor circuit techniques.

A third function completed by applying power to the system through the transistor 106 is to set a transmit flip-flop 130 by applying a signal on a line 132 as generated at the output of a two input NAND gate 134. The input of the NAND gate 134 changes states momentarily as a capacitor 136 is charged by transistor 106. The fourth function completed by turning on the transistor 106 is to a sequencer 140, which is part of the logic network 28. The sequencer 140 is a five bit shift register that is cleared to state zero by a momentary signal applied to the reset terminal on a lead 142 from the gate 134.

Setting the transmit flip-flop 130 generates a signal to a NAND gate 144 wherein it is inverted and applied to the oscillator 30 through a resitor 146. The output of the NAND gate 144 is also applied to the transmit amplifier 32. This causes the oscillator 30 to start and also turns on the amplifier which will apply the frequency tone signal through a transformer 148 and the attenuator switch 38 to a pair of tuned circuits. One of the tuned circuits includes an inductor 150 in series with a capacitor 152 coupled to the ring jack 78. The second tuned circuit includes an inductor 154 in series with a capacitor 156 connected to the tip jack 76. Both of the tuned networks are part of the tuned input network 34 that also includes a polarity detector circuit to be described.

With reference to the oscillator 30, this is a basic series fed Colpitts oscillator using a field effect transistor 158 as an active element. The frequency of oscillation is variable by means of an inductor 160 in series with the transistor 158. When utilizing the invention in communication systems, all signals on the cabling pair to be identified must not interfere with any conversation or data on the line. This isolation is achieved by operating the oscillator 30 at 15 KHz which, for the most part, is out of the communications band.

A diode 123 is connected to a reference voltage at the junction of resistors 124 and 126 so that the timer can be disabled by shorting the reference to ground.

Typically, the transmit amplifier 32 may be an RCA Model CA3020A integrated circuit DC wide band power amplifier. A resistor 162 supplies bypass current to the amplifier and a capacitor 164 couples the amplifier input to the oscillator output. Amplifier gain adjustment is provided by a potentiometer 166 and attenuating capacitors 168 and 170.

As the transmit flip-flop 130 energizes the oscillator 30 and activates the amplifier 32 it also sets the sequencer 140 by applying a signal through a resistor 172 to the sequencer and by generating a clock pulse on the line from an interdigit timer 184. The pulse on line 174 clocks the sequencer 140 in response to a pulse on an output from the transmit flip-flop 130 which is connected to inverter 178 which, in turn has, an output interconnected with the outputs of inverters 176 and 180. The interconnected output of the inverters 176, 178 and 180 causes the output of an inverter 182 to change states thereby turning on the interdigit timer 184. An output from the transmit flip-flop 130 is also applied to an inverter 186 having an output applied to connect a capacitor 188 in parallel with a capacitor 190 to ground. This sets the time constant of the interdigit timer 184 for the transmit mode.

The interdigit timer 184 is a variable length, synchronized timer used to generate clock pulses for the sequencer 140. It functions generally the same as the overall time 114, previously described. The basic timing interval is determined by a resistor 192 in series with a capacitor 190 and is about 32 milliseconds. This time is lengthened to 950 milliseconds by paralleling capacitors 188 and 190. When the voltage across capacitor 190 reaches the reference level set by a resistive divider including resistor 193 and 195, the timer fires a positive pulse into an inductor 197 and provides a clock pulse to the sequencer 140.

In the receive mode, the timer is used to detect the 40 millisecond pulses in order to shift the sequencer 140. In the display mode, operation of the sequencer 140 starts the timer which fires 1.1 seconds later to advance the sequencer back to state 00.

The field unit 12 is now in the transmit mode and will send a frequency tone signal on the wire pair 24 until the transmit flip-flop 130 is reset. This occurs when the interdigit timer 184, which is now running, fires after the preset time interval and puts a clock pulse on the line 174 to the sequencer 140. This produces a logic signal on a line 192 which is inverted in NAND gate 194 to reset the transmit flip-flop 130. When this flip-flop resets, the logic signal applied to the sequencer 140 through the resistor 172 is held for a predetermined time interval by charging a capacitor 196. This is to insure that the proper logic signal is present until after the clock pulse on line 174 hash been completed.

Following the above procedure, the field unit sequences to the receive mode and the sequencer 140 is then in state ONE. A logic signal on line 192 is applied to a units register 198 of the units display and 40 and a tens register 200 of the tens display and decoder 42. These registers are two decade counters that are now reset to zero. The output of a NAND gate 194 also tied to the line 192 sets a polarity flip-flop 202.

When in the receive mode, data will be received from the office unit 10 within a predetermined time interval in the form of bursts of a frequency tone signal. The path of this signal is the wire pair 24 to be identified, the tuned circuits including the inductors 150 and 154 and associated capacitors and the transformer 148. During the receive sequence, the transmit amplifier 32 has been turned off by resetting the transmit flip-flop 130 and will not interfere with the reception of the pulse code wire pair identifying signal.

A received signal is stepped up voltagewise by the transformer 148 and then coupled to the two-stage receive amplifier 36 through 204. In the receive amplifier 36, the identifying signal is amplified and coupled to a Schmitt trigger detector 206 shown in FIG. 1 as part of the block 36. The output of the amplifier 36 is coupled to the detector 206 through a capacitor 208. The output of the detector 206 is a DC pulse train which has a format shown in FIG. 3 and represents the pair number which is to be displayed.

Referring to the receive amplifier 36, it is composed of two gain stages 213 and 215 using identical SN 72741P operational amplifiers. The first stage 213 has an AC gain determined by the impedance ratio of a capacitor 210 and a resistor 212, and operates within its linear range. The second stage 215 operates in a saturated mode over the entire range of signal levels to be received and is coupled to the first stage through a capacitor 214 and generates a pulsed output.

The Schmitt trigger detector 206 is a dual, four input, integrated circuit Schmitt trigger. The first Schmitt trigger 219 is used as a shaping circuit for the series of pulses from the receive amplifier 36 and has two inputs tied together and connected to a resistor 216 which is grounded. The second Schmitt trigger 220 is used as a detector which does not follow each individual pulse, but rather puts out a continuous high level logic signal as long as pulses are present.

The pulse train from the Schmitt trigger 206 will be processed by two different circuits to recover the wire pair identification information for each. The first circuit is the interdigit timer 184 which responds to the 40 millisecond pulses of FIG. 3 to shift the sequencer 140 to states TWO through FIVE. The second circuit is a digit timer 218 which utilizes the 20 millisecond pulses of FIG. 3 to cause the units display and tens display to count and is also utilized to reset the polarity flip-flop 202.

With reference to FIG. 3, the first pulse output from the Schmitt trigger 206 is 40 milliseconds long and produces a logic level change at the output of Schmitt trigger 220. This signal is applied to resistors 222 and 224 of the digit timer 218 as the supply power and is also applied to the input of the inverter 176 connected to the interdigit timer 184. Both timers start and after a predetermined time interval, the digit timer 218 provides a positive pulse to a NAND gate 226 having an output to enable gates 228, 230 and 232. Enabling these gates does not affect the circuit to which they are connected at this time as the sequencer 140 is still in state ONE. After the digit timer 218 fires, it cannot fire again until the output of the Schmitt trigger 220 changes logic levels.

After a second time delay, the interdigit timer 184 produces a pulse on the line 174 and shifts the sequencer 140 from state ONE to state TWO with a logic signal change on the line 192 and a logic signal change on a line 234. This enables the units register 198 to begin accumulating a count. At the end of 40 milliseconds, the first pulse of FIG. 3, the Schmitt trigger 220 shifts logic levels and recycles both timers 184 and 218. With the digit timer 218 set, an output of the gate 228 makes the clock input of the units register 198 change logic levels and store a one in the register.

When the output of Schmitt trigger 220 again changes states, the previous sequence is repeated storing a count of two in the units register 198, the exception being that the interdigit timer 184 will not time out when receiving only a 20 millisecond pulse, and the sequencer 140 remains in state TWO.

Any number of counts may be stored in the units register 198 as long as a 40 millisecond pulse does not arrive and shift the sequencer 140 into state THREE. When the next 40 millisecond pulse appears, the interdigit timer 184 times out and shifts the sequencer 140 to state THREE thereby enabling the tens register 200 through the gate 230. The units register is now inhibited.

Assuming a two count in the register 198, this will be displayed later. The tens register 200 receives and stores counts in identically the same manner as just described and when the last count is received, the 40 millisecond pulse shifts the sequencer 140 to state FOUR thereby enabling the polarity flip-flop 202 so that it may be reset.

With reference to FIG. 3, a pulse may or may not be received for the polarity determination. If a pulse is received, the polarity flip-flop 202 will be reset in the same manner as storing counts in the registers. However, if a polarity pulse is not received, the 40 millisecond pulse that shifted the sequencer 140 to state FOUR will be extended to 100 milliseconds and the interdigit timer 184 will run out and shift the sequencer to state FIVE.

Assuming a polarity pulse is received, it is coupled to the polarity alarm logic 250 along with the output of the polarity detector circuit 34 which determines if electron flow on the wire pair under test is of normal polarity. The tip jack 76 and the ring jack 78 are connected to the line under test and if the polarity is correct, ring jack most negative, a transistor 231 is back biased through resistor 233 and 235 and remains off and no current flows through a resistor 237. With zero volts across resistor 237, a field effect transistor 239 is saturated and its output at a resistor 241 is low and this is connected to an input of a gate 243 of the polarity alarm logic 250. The gate 243 is in turn connected to a gate 245 and under normal polarity conditions the audible alarm 70 remains deenergized.

Now, if the polarity of the line is reversed, tip jack 76 more negative than the ring 78, the transistor 237 is forward biased and saturates, applying a negative potential across the resistor 237. This reverse biases the transistor 239, turning it off and its output goes high and the gate 243 sets the gate 245 to actuate the alarm 70.

Since the field unit 12 is referenced to ground, when the transistor 231 saturates, current from the line flows through resistor 237, the chassis, and back to the central distribution office through the earth or a sheath ground. A capacitor 247 is used to bypass any AC voltage that may appear across the line. A resisitor 249 maintains the transistor 231 zero biased when the line is normal. A Zener diode 251 is connected in series with the resistor 233 to prevent detection unless the ring jack of the line is approximately 6 volts more negative than the tip jack. A diode 253 in series with the resistor 235 prevents a negative battery voltage from the ring jack of the line from appearig on the tip jack side and thus interfering with the polarity test made by the office unit 10.

State FIVE of the field unit 12 is the display mode which canot be activated uless the necessary pulse train has been received from the office unit 10. In state FIVE, the sequencer 140 terminates the overall timer 114 and restarts the interdigit timer 184 through an iverting amplifier 236. This adds a capacitor 238 in parallel with the capacitor 188. In addition, the sequencer 140 starts the display multivibrator 44 through a NAND gate 240 and a diode 242 tied to the junction of resistors 244, 246 and 248.

With the display multivibrator 44 running, power is applied to the tens and units displays 40 and 42 each of which consists of a seven segment solid state indicator with current limiting resistors and decoders. The decoders 199 and 201 translate the binary coded decimal (BCD) content of the registers 198 and 200 to the format needed to drive the indicators. The display multivibrator 44 also supplies power to the polarity alarm logic 250 for driving the audible alarm 70. Power is supplied to the polarity alarm logic 250 from the collector of a transistor 252 in series with the audible alarm 70 and a resistor 254. The polarity alarm logic compares two bits of information to determine if an audible alarm indication is needed. The first bit of information is provided by the office unit 10 from a voltage test made on the wire pair 24 and sent to the field unit 12 as the polarity digit. The second bit of information is obtained by making a current test on the pair by the field unit 12 to see if it is reversed from what is thought to be the tip jack connection and the ring jack connection based on a color code of the pair. This bit of information is provided by the polarity detector 34 to the gate 243. The polarity alarm logic performs an exclusive NOR function of these bits of information and sets the audible alarm accordingly.

In state FIVE, the sequencer also turns on the transistor 116 through a resistor 256. Turning on the transistor 116 turns off the indicator 104 and the silicon controlled rectifier 102. The power switching transistor 106, however, remains in the ON state. During this time, the interdigit timer 184 is running and the pair number is displayed for observation by an operator. After a preset time interval, the interdigit timer 184 times out and advances the sequencer 140 to turn off the transistor 116 and consequently turn off the power switching transistor 106. With the transistor 106 in an OFF state, all power is disconnected from the circuits and the set is ready for another cycle.

Figure 5:
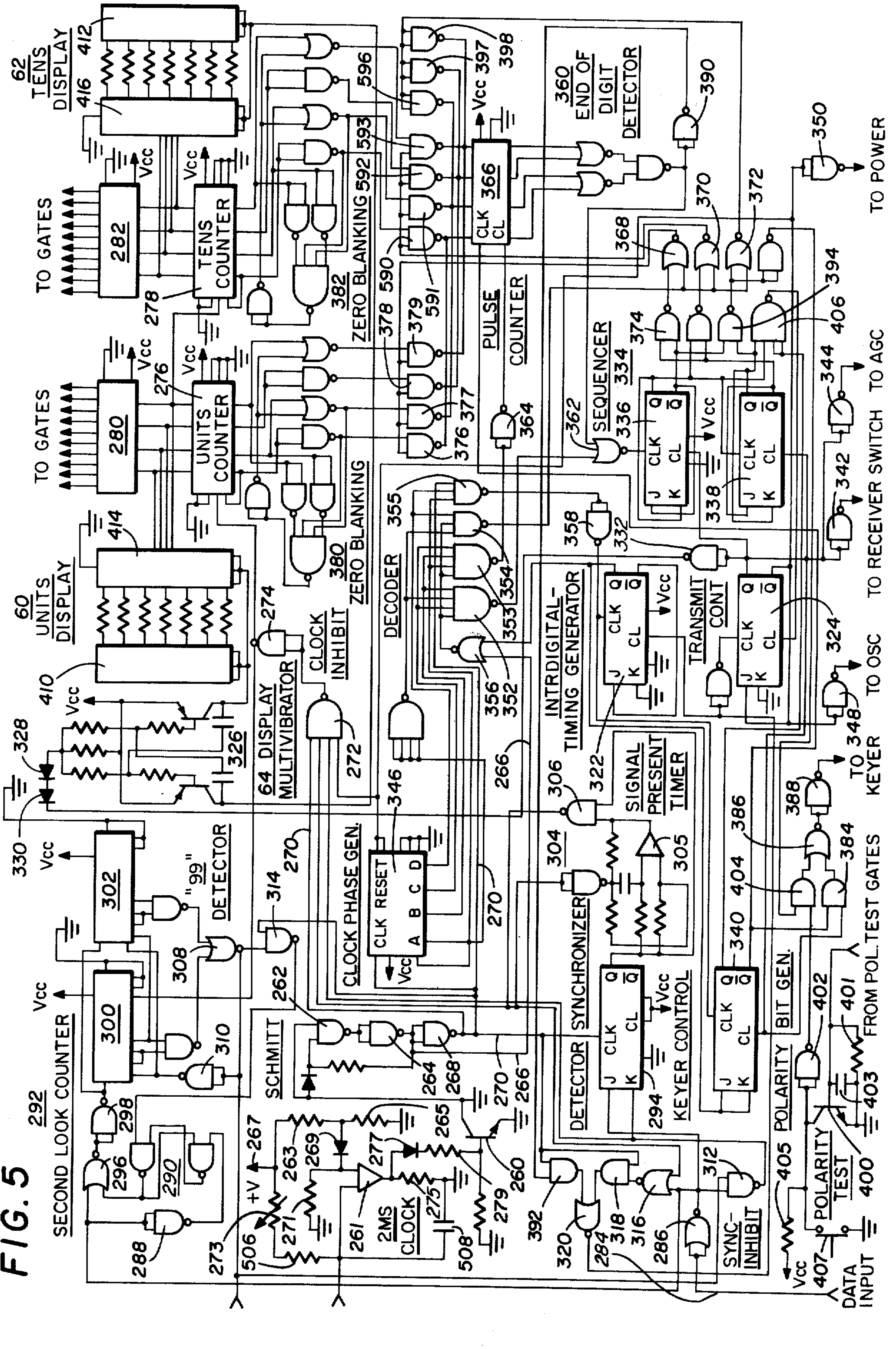
FIG. 5 is a logic diagram of a logic network of the office control unit of FIG. 1.

Referring to FIG. 5, there is shown a logic diagram for the circuitry of logic and associated timers 50 of the office unit 10. A source of master timing pulses which controls all circuitry in the office unit is applied at the base electrode of a transistor 260. This transistor applies a timing pulse to a Schmitt trigger comprising gates 262 and 264 and appears at the output of the gate 264 as a phase ONE clock on a line 266. The output signal from the gate 264 is inverted in a gate 268 and the output of this gate is a phast TWO clock on line 270. Line 270 connects to a clock inhibit gate 272 which has an output that follows the phase TWO clock.

The master clock is a source of timing pulses controlling all circuits in the office unit 10. It is basically a free running relaxation oscillator using a programmable unijunction transistor 261 as the active element. Resistors 263 and 265 divide a DC voltage applied to a terminal 267 and apply a voltage through a diode 269 to a resistor 271 and the gate input of the transistor 261. The anode of the transistor connects to the junction of an RC network of a capacitor 508 and resistor 506. A potentiometer 273 adjusts the time constant of the RC network to 2 milliseconds.

An output pluse from the transistor 261 is generated across a resistor 275 after which the transistor turns off and the capacitor 508 begins to recharge starting a new cycle. A diode 277 connects the pulse through a current limiting resistor 279 to the base of the switching transistor 260, turning it on. This creates a fast, low going pulse used to drive the Schmitt trigger.

The output of the gate 272 is inverted in a gate 274 and appears as a clock pulse to the units counter 276. This is a decade counter, that is, it counts 0—9 and starts over, and stores its count in binary coded decimal. For every master clock pulse, the counter 276 causes the count to be incremented by 1 and when 9 is reached, the next pulse recycles the count to zero. This counter comprises a part of the tone detection counter 54 of FIG. 1. The most significant digit output of the units counter 276 connects to the clock input of the tens counter 278. Each time the unit counter cycles once the count in the tens counter 278 is incremented by 1. Thus, the units counter divides the clock pulses by 10 and the tens counter divides them by 100.

The outputs of the counter 276 are applied to a binary coded decimal-to-decimal decoder 280. There are ten outputs generated from the decoder 280 which are normally at the same logic level except for the one that represents the binary coded decimal imput. That is, if the units counter 276 is storing a 2, then output No. 2 of the decoder 280 will be at a different logic level.

Similarly, the contents of the tens counter 278 is decoded by a decimal decoder 282. The two decoders 280 and 282 are arranged in a 10 × 10 matrix for generating 100 enabling signals to the 100 signal gates 46. Enabling a signal gate causes any frequency tone signal that is present upon a wire pair associated with a particular gate to be sent to the analog section of FIG. 6, as will be explained.

As perviously stated, the office unit 10 is normally in the scan mode looking for a frequency tone signal on a wire pair associated with one of the signal gates. When a tone is detected, a signal on the line 284 from the receiver 48 changes the logic level output of a gate 286. The output of the gate 286 is coupled to a gate 288 of a second look counter 292 and inverted and applied to the input of a flip-flop 290 that enables the second look counter.

The second look counter 292 functions to prevent the scanning process from being stopped unless there is a detector output twice for the same signal gate 46, thus insuring that all other gates have been looked at by the detector. The clock input to the second look counter 292 is pulsed at the same time as the units counter 276 and thus counts at the same rate when enabled, but does not necessarily store the same count. The basic counter is composed of two decade counters 300 and 302 wired in series to form a module 100 counter having reset capability to 00 at any time, except on count 99. This counter is enabled only after a detector output occurs and is removed and this happens when a signal gate having a frequency tone is enabled causing a detector output, and then, inhibited as the scanning process continues, thus removing an output. Each time a detector output occurs, the second look counter 292 is reset to 00 and held there for 1 clock pulse and then enabled again. Once the count of 99 is reached, however, it cannot be reset to 00 as it is locked in this state by the output of a gate 308.

The output of the gate 286 also connects to the input of the detector synchronizer 294 which will be set when the next clock pulse appears at the clock terminal on line 270. When a clock pulse appears, the detector synchronizer 294 is set and the units counter 276 is incremented by 1. This causes the frequency tone signal to be lost because the signal gate 46 previously enabled is now inhibited. The detector synchronizer 294 is a flip-flop that serves as an interface between the analog section and the control logic section. Its main function is to indicate changes in the detector's state at predetermined time intervals.

With no signal present, the output of the gate 286 changes logic state which in turn changes the output of a gate 296. The logic state of a gate 298 also changes which enables both decade counters 300 and 302.

A signal present timer 304 is now running as energized by a signal from the output of the detector synchronizer 294. The timer 304 includes an RC network and a programmable unijunction transistor 305 and is used to check the validity of the received signal. This means that the detector synchronizer 294 must remain set for a preset time in order for the timer 304 to run out to change the logic output of a gate 306. If no frequency tone signal is being received, the logic signal from the gate 286 conditions the synchronizer 294 to reset on the next phase TWO clock pulse on the line 270. This also recycles the timer 304. This same phase TWO clock pulse on the line 270 also increments the units counter 276 and the second look counter 292.

The scanning process continues and additional wire pairs are examined to see if a frequency tone signal of a magnitude larger than the first encountered is present before a count of 99 is reached in the second look counter 292. If a larger signal is detected, the second look counter is immediately reset to zero and the units counter 276 is incremented by 1 and scanning resumes. This process is repeated as many times as necessary while looking for the wire pair with the largest signal. When this pair is found, the same action as described above takes place and scanning continues. However, the second look counter 292 counts to 99 as no other wire pairs will cause an output from the detector 48. On the count of 99, a 99 detector including the gate 308 goes high to complete four operating procedures. The purpose of the 99 detector is to detect when the second look counter 292 has reached the count of 99.

First, a signal is applied to a gate 310 preventing the counter 300 from being reset if a signal is detected. Second, it enables a sync inhibit gate 312 so that when a frequency tone is detected, the output of this gate changes logic states. Third, a signal to the gate 308 applies an input to a gate 314 to reset the second look flip-flop 290. Fourth, a signal is applied to the automatic gain controlled receiver 48 to lower the detection level so that trapping is insured.

With the second look counter 292 at position 99, the signal gate 46 that last gave an output is again enabled, and if the tone frequency signal is still present, the output of the gate 286 changes states. Changing the output state of the gate 286 also changes the output state of the gate 312 and the clock inhibit gate 272 changes its output state. This prevents phase TWO clock pulses on the line 270 from incrementing the units counter 276 and the second look counter 292.

At this time, the detector synchronizer 294 is set, thereby starting the signal present timer 304. As long as the frequency tone signal persists, the scanning process is halted and after a preselected time period the gate 272 inhibits further action on the counter and a gate 316 inhibits all other action in the office unit 10 except the master clock pulse.

The office control unit is now in the sync mode and will remain in this mode until the frequency tone signal is removed from the wire pair connected to the enabled signal gate 46. The purpose of the sync mode is to prevent sending data until the precise moment at which the field unit 12 is ready to receive pulse code information.

When the frequency tone signal is removed from the wire pair by action of the field unit 12, the gate 286 changes state which changes the state of the gate 316 and in turn the output of a gate 318. The detector synchronizer 294 is also reset. With the gate 318 so conditioned, the next phase TWO clock pulse to appear on the line 270 changes the logic state of the output of a gate 320 and clears an interdigital timing generator 322 to provide a 40 millisecond tone burst at the beginning of each block of data to be transmitted. Also, the change in state at the output of the gate 320 sets a transmit control 324 and the office unit 10 is now in the transmit mode. The primary purpose of the transmit control flip-flop is to change the office unit from the sync mode to the transmit mode.

In the transmit mode of the office unit 10, data is sent to the field unit 12 in the form of an on/off frequency tone burst having the format of FIG. 3. Circuits generating this pulse code require special timing and gating functions following a specific sequence. The timing pulses are generated by dividing the master clock by 10 with a decade counter and decoding the specific counts and then gating these pulses at the proper times to various circuits. A four bit BCD counter is reset and then preset with a number which represents the unit digit. After a 40 millisecond interdigital timing period (see FIG. 3), this number is transmitted to the field unit 12 by symmetrically interrupting a frequency tone every 20 milliseconds for the correct number of times. At the end of this digit, the sequencer is advanced one step and the above procedure is repeated for the tens digit and then the polarity digit. The office unit 10 then returns to the scan mode.

With the transmit control flip-flop 324 set, a display multivibrator 326 starts by grounding diodes 328 and 330 with a gate 332. In addition, setting the flip-flop 324 enables a sequencer 334 by a signal to flip-flops 336 and 338. The sequencer 334 controls the order in which data is sent while the office unit 10 is in the transmit mode and then returns to the scan mode. It consists of two binary counters 336 and 338 and a one out of four decoder.

At this time a keyer control flip-flop 340 is also enabled by the transmit control 324. The transmit control flip-flop 324 also disables the receiver 48 through a gate 342 and discharges the AGC line through a gate 344. An output from the transmit control flip-flop 324 also enables a clock phase generator 346 to divide the main clock by 10 for generation of certain clock and gating pulses. The phase TWO clock is also inhibited from incrementing the units counter 276 and the second look counter 292 through the clock inhibit gate 272. An output of the transmit control 324 also turns on the oscillator 56 through a gate 348 and enables the transmit amplifier 58 through a gate 350.

An output from the clock phase generator 346 is sent to gates 352–355 as part of a 6–7–8–9 decoder. In this decoder, the phase ONE clock on line 266 gates the 6, 7 and 8 decoder under control of the interdigital timing generator 322 through a gate 356. The phase TWO clock on line 270 gates the count of 9 directly to the decoder at an input to the gate 355 which gives a 3 microsecond output every 20 milliseconds as long as the clock phase generator 346 is enabled. This output is inverted in a gate 358 to clock both the keyer control 340 and the interdigital timing generator 322.

At the beginning of the transmit cycle, the transmit control 324 is set, the interdigital timing generator 322 is reset, the keyer control 340 is reset, the clock phase generator 346 is set to zero count, the sequencer 334 is in state 00 and a tone frequency is being transmitted to the field unit 12. At every master clock pulse, the clock phase generator 346 is incremented by 1 and after 14 milliseconds, at the end of count 6, the phase ONE clock on line 266, through gate 356, gates this count into the decoder. A pulse output from the gate 352 is transmitted through a gate 362, however, at this time it has no effect on the output of this gate because of the output of an end-of-digit detector 360. After 16 milliseconds, at the end of count 7, a 3 microsecond pulse occurs at the output of the gate 353 and is transmitted as a reset pulse through a gate 364 where it is inverted and applied to a pulse counter 366. This is the clear terminal of the pulse counter 366 and resets it to zero. At the end of count 8, a three microsecond pulse enables the units, tens and polarity preset gates 368, 370 and 372, respectively, At this time, the sequencer 334 is in state 00 and the output from a gate 374 is coupled to a gate 368. This causes the output of the gate 368 to change logic states and this is applied to gates 376–379. This gates the contents of the units counter 276 to the pulse counter 366.

The purpose of the pulse counter 366 is to keep a running total of the number of pulses needed for each digit being transmitted to the field unit 12. Any count may be preset into the pulse counter by initial setting and it is in this manner that the contents of the units counter 276 and the tens counter 278 are preset into the pulse counter 366. In addition, the end-of-digit detector 360 decodes the output of the pulse counter 366 to indicate when the count of 15 is reached. As arranged in FIG. 5, the pulse counter stores the complements of the count in the units counter 276 or the tens counter 278. To facilitate generating the zero complement, a "zero" blanking circuit 380 monitors the units counter 276 and a zero blanking circuit 382 monitors the tens counter 278.

At the end of 20 milliseconds, at the end of count 9, a 3 microsecond pulse at the output of gate 355 is inverted in the gate 358 and clocks the interdigital timing generator 322 and also the keyer control 340. The interdigital generator 322 is set prior to the clock pulse, and once set, it cannot change its state with subsequent clock pulses until it is reset by a pulse on a clear terminal. The clock pulse from the gate 358 has no effect on the keyer control 340 at this time. With the interdigital timing generator 322 set, an output therefrom to the gate 356 inhibits the phase ONE clock on line 266 from gating the decoder inputs, and then inhibits the counts of 6, 7 and 8.

To complete the preceding operation, a 20 millisecond time has elapsed since the office unit 10 entered the transmit mode and a solid frequency tone has been transmitted to the field unit 12 during this time. The clock phase generator 346 has made one complete cycle and is recycled to a zero state ready to begin a new cycle. At this time, as the counts of 6, 7 and 8 are reached, no circuit action takes place because the decoder is inhibited for these counts. After 20 milliseconds, at the end of count 9, the keyer control 340 is clocked and it is set by an output from the interdigital timer generator 322. This inhibits a keyer gate 384 having an output applied to a gate 386 which in turn sets a subsequent gate 388 to switch off the frequency tone being transmitted to the field unit 10. This same output from the keyer control 340 causes the clock input to the pulse counter 366 to go low and conditions it to count at the appropriate time. Exactly 20 milliseconds later, another clock pulse will occur at the clock terminal to the keyer control 340 causing it to reset. This changes the logic state of the gates 384, 386 and 388 thereby switching on the frequency tone for transmitting to the field unit 12 and increments the pulse counter 366 by 1.

The keyer control 340 continues to change state every 20 milliseconds until the pulse counter reaches the count of 15. At this time, the end-of-digit detector 360 generates an output coupled to a gate 390 that now changes logic states. The output of the gate 390 is coupled to a gate 392 as part of the sync inhibit network. Two milliseconds later the phase TWO clock on line 270 changes the state of the second input to the gate 392 and the output of the gate 320 changes resetting the interdigital timing generator 322.

With the interdigital timing generator 322 reset, the phase ONE clock on line 266 is enabled to gate the decoders for counts 6, 7 and 8 and also inhibits the keyer control 340. At the end of count 6, the 3 microsecond pulse occurs at the gate 352 that is transmitted through the gate 362. This gate has previously been enabled from the end-of-digit detector 360 and its output clocks the sequencer 334 to state 01. At the end of count 7, the pulse counter 366 is reset as previously explained. At the end of count 8, the preset gates are again enabled by a pulse output of the gate 354 and since the sequencer 334 is in state 01, the tens preset gate 370 transmits an output to gates 590–593. This gates the contents of the tens counter 278 into the pulse counter 366. At the end of the count 9, the generator 322 is set which inhibits the counts of 6, 7 and 8 and also enables the keyer control 340. The circuits now function in the same manner as previously described for transmitting units information, that is, the keyer control 340 changes state every 20 milliseconds and increments the pulse counter 366 until the end-of-digit detector 360 causes the interdigital timing generator 322 to be reset.

Having completed the transmission of a pair of number to the field unit 12, the office unit now sends an extra bit of information indicating the polarity of the wire pair under test. At the end of count 6, the sequencer 334 is advanced to state 10 and at the end of count 7, the pulse counter 366 is again reset. When the end of count 8 is reached, the polarity preset gates 394 and 372 are enabled to sequence gates 396–398 and causes a 14 to be preset into the pulse counter 366. At the end of count 9, the interdigital timing generator 322 is set which enables the keyer control 340 and inhibits the counts of 6, 7 and 8. Twenty milliseconds later, the keyer control 340 is set, and if the polarity of the wire pair being tested is normal, than a transistor 400 will be nonconducting which condition will be transmitted through a gate 402 and through a gate 404 to the gate 386. This causes the gate 388 to switch off the frequency tone being transmitted to the field unit 12 generating the pulse 86 of FIG. 3. However, if the polarity is reversed, the transistor 400 will be conducted and since the sequencer 334 is in state 10, the gate 388 will be in a state that the tone frequency will be transmitted continuously to the field unit 12.

In addition to the transistor 400 and the gate 402, the polarity bit generator is composed of a resister 401 in parallel with a capacitor 403 and a resistor 405 all connected to the transistor 400. If the wire pair being identified has a normal polarity in the control unit 10, a voltage across the resistor 401 will keep the transistor 400 turned off and a voltage developed across the resistor 405 sets the gate 402 as previously described. However, if the pair being identified is reversed in the office unit 10, a voltage across the resistor 401 will turn on a transistor 400 again setting the gate 402 as described previously. The capacitor 403 is included in the circuit to keep the transistor 400 from switching on for short duration pulses. In order to test the system's ability to detect a reverse polarity on a wire pair, a momentary contact switch 407 is provided on the front panel of the office unit 10. The function of this switch is to make the transistor 400 appear to be on so as to transmit reverse polarity information to the field unit 12, which should respond with an audible alarm.

Twenty milliseconds later, at the end of the count 9, the keyer control 340 will be reset and this advances the pulse counter 366 to count 15. The end-of-digit detector 360 sets the gate 390 which in turn changes the logic state of the gate 392 and the next phase TWO clock pulse resets the interdigital timing generator 322. When the clock phase generator reaches count 6, the sequencer 334 is advanced to state 11 and at count 7 resets the pulse counter 366 to zero. Count 8 has no effect on this cycle as no information is to be transmitted. At the end of count 9, the interdigital timing generator 322 is set which enables the keyer control 340 and inhibits the counts 6, 7 and 8. The clock phase generator 346 is now on zero and beginning its last cycle. Twenty milliseconds later, at the end of count 9, the keyer control 340 is set causing the output of a gate 406 to reset the transmit control 324.

When the transmit control 324 is reset, the display multivibrator 326 is stopped, the sequencer 334 is inhibited and reset to state 00 and the keyer control 340 is reset. In addition, the gate 384 is inhibited and the gate 342 enables the receiver 48. Finally, the AGC line to the receiver 48 is unclamped through the gate 344. Resetting the transmit control 324 also inhibits the clock phase generator 346 and resets it to zero. The phase TWO clock on line 270 is enabled to be gated to the units counter 276 and the second look counter 292 through the clock inhibit gate 272. The transmit control 324 turns off the oscillator 56 through the gate 348 and inhibits the transmit amplifier 58 through the gate 350.

When the keyer control 340 is reset, this causes the pulse counter 366 to store a count of 1 which remains in the counter until the next transmit cycle for another wire pair. The office unit 10 is now back in the scan mode.

During the transmit mode, the identification of the wire pair under test is available at the office unit by two 7-segment, solid state readout units 410 and 412. The contents in the units counter 276 are transferred to the display 410 through a decoder 414. The contents of the tens counter 278 are transferred to the tens display 412 through a decoder 416. Also coupled to the display units 410 and 412 and their associated decoders 414 and 416 is the display multivibrator 326 to switch power between the display unit.

Figure 6:
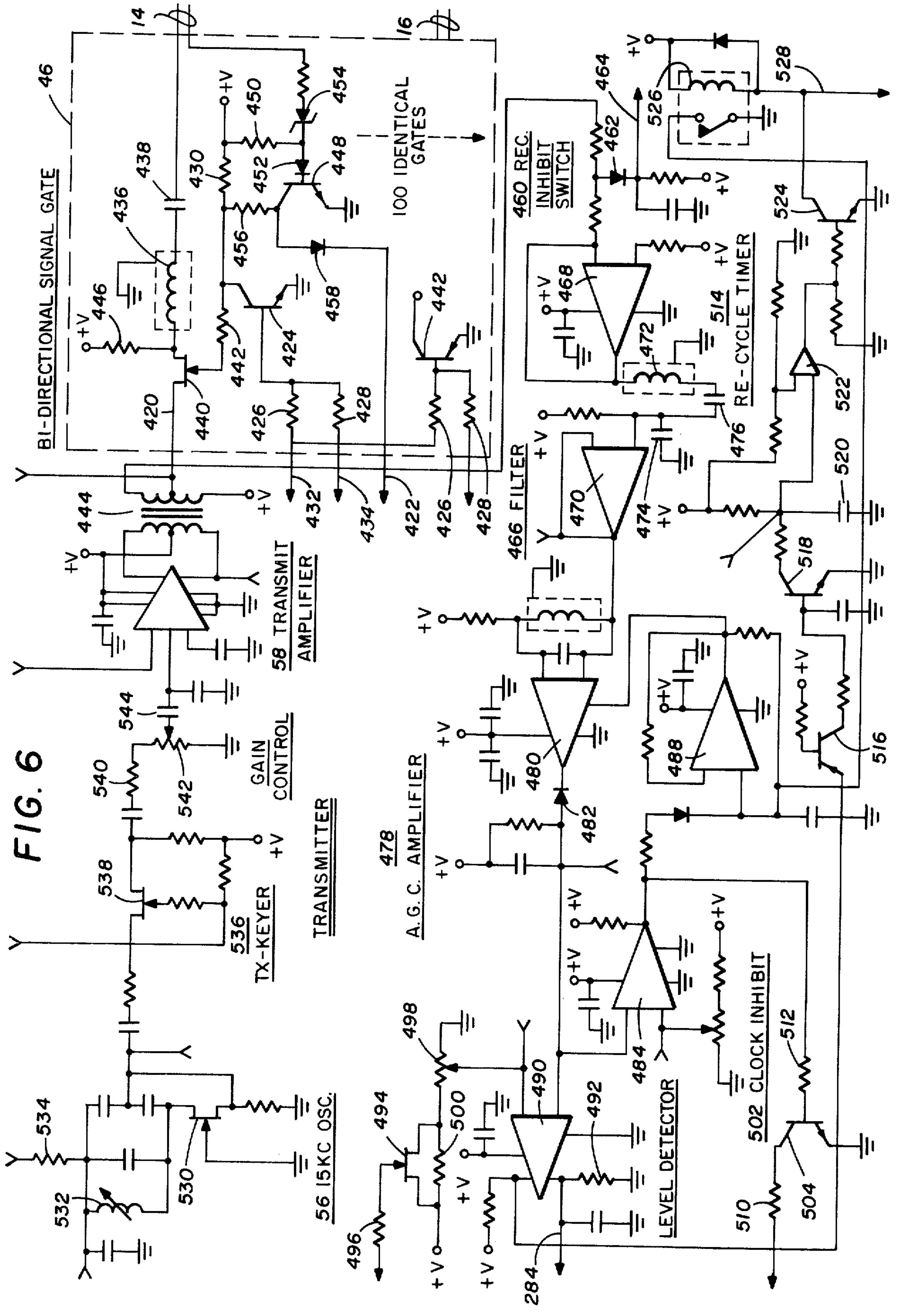
FIG. 6 is a schematic diagram of the analog portion of the control unit of FIG. 1.

Referring to FIG. 6, there is shown schematically the analog section of the office unit 10 including gate 0 of the signal gate network 46. The purpose of each signal gate is to connect the AGC receiver to one wire pair in the scan mode for receiving a frequency tone signal from the field unit 12. In the transmit mode of the control unit 10, a signal gate transfers frequency pulsed coded data in the opposite direction from the office unit to the field unit 12 over the same wire pair. In addition, a voltage test is made on one conductor of the pair being identified to determine if the polarity of that pair is reversed. Both functions just described occur simultaneously and are controlled by an enable gate transistor 424 having two inputs, one of tens enable and the other a units enable.

With 100 wire pairs connected to the control unit 10, 100 signal gates are required, one for each wire pair. In order to multiplex the 100 gates to the receiver 48, the enable transistors 424 of each signal gate are arranged in a 10 × 10 matrix driven by the decade counters 276 and 278 through respective decoders 280 and 282. As the units counter 276 and the tens counter 278 are advanced during the scan mode, there will be only one signal gate enabled at 1 time. When any signal gate is enabled, the frequency tone signal, if present, will appear on the line 420. At the same time, if the polarity of the wire pair being tested is reversed, a positive potential will appear on a line 422.

Each signal gate consists of an enable gate, analog switch and a polarity detector. The enable gate is a two input NOR including transistor 424 and resistors 426, 428 and 430. The transistor 424 is normally saturated until it is addressed on the line 432 from the decoder 282 and simultaneously on the line 434 from the decoder 280. This turns off the transistor 424 and the resistor 430 now functions as a current source for the analog switch and polarity detector sections.

The analog switch connects the transmitter and receiver to one side of the wire pair being tested. It consists primarily of a resonant circuit including an inductor 436 in series with a capacitor 438. This circuit can be switched through a common mode when a sample needs to be taken of the pair under test. This switch must supply a low impedance path at the signaling frequency for maximum power transfer and must also represent a very high impedance at nonsignaling frequencies to minimize interference on working pairs. Second, the switch generates insignificant switching transient as samples are taken to prevent interference to the line an noise spikes that would desensitize the AGC receiver 48.

When a signal gate is enabled, transistor 424 turns off and a transistor 440 is supplied with gate current through the resistor 430 and a resistor 442 thereby causing this transistor to turn on. This supplies a low impedance path at the frequency tone signal from one side of the wire pair through the series resonant circuit (inductor 436 in series with the capacitor 438) and the transistor 440 to an output transformer 444 as part of the transmit amplifier 58.

In order to eliminate transients on the line from affecting the operation of the office unit 10, the inductor 436 is maintained at a constant DC voltage level at all times. With the transistor 440 in an off state, the inductor 436 is held at supply voltage through a resistor 446. As a transistor 440 is turned on and saturated, the inductor 436 remains at the supply voltage because the source electrode of transistor 440 is also held at the supply voltage through a center tap of the transformer 444. In order to minimize switching transients to the receiver 48, the secondary of the transformer 444 has very low winding resistance to minimize DC offset.

Also, the signal gates are switched from one to the next in nanosecond time to keep the DC current in the transformer 444 constant to prevent an inductive kick at the AGC receiver 48.

The polarity detector makes a voltage test on one side of the wire pair to determine if it is reversed or not. A transistor 448 is normally held into a conducting state by current supplied through a resistor 450 and a diode 452. If the line under test has the correct polarity, a Zener diode 454 remains off and transistor 448 remains saturated. However, if the line is reversed, the Zener diode 454 breaks down and conducts to back bias the diode 452 thereby turning off the transistor 448. Each time the enable gate of transistor 424 is addressed, this transistor turns off and if the pair is reversed, a pulse will appear on the line 422 because transistor 448 is also off thereby allowing current to flow from a supply through resistor 430 and a resistor 456 and a diode 458.

Referring to the analog section of FIG. 6, this section of the office unit 10 comprises basically the AGC receiver which processes the incoming frequency tone signal from the signal gate and converts it into appropriate DC level for the control logic of FIG. 5. The second basic component of the analog section is the transmitted 58 which sends data from the office unit 10 to the field unit 12.

The AGC receiver 48 includes a receive inhibit switch 460 at the input thereto that squelches the receiver during the transmit cycle. This switch is off in the scan mode of the office unit and turns on to shunt all incoming signals to ground during the transmit mode. Componentwise, the switching element is a diode 462 connected to the gate 342 by a line 464.

Connected to the switch 460 is a filter circuit 466 that consists of two amplifiers 468 and 470 interconnected by a series tuned circuit of an inductor 472 and capacitors 474 and 476. The filter circuit reduces noise spikes and rejects unwanted signals.

The output of the amplifier 470 of the filter 466 connects to an automatic gain control amplifier 478 including an amplifir 480, a rectifier diode 482, a ramp generator 484 and a hold circuit including an amplifier 488. The function of the AGC amplifier 478 is to develop a DC signal of some preset value which represents the largest amplitude of frequency tone signals detected from any one of the signal gates. This DC signal level is on a gate-by-gate basis and once established, is retained by the hold circuit keeping the gain of the amplifier constant.

Coupled to the output of the AGC amplifier 478 is a level detector comprising a DC amplifier 490 for comparing the level of the rectified tone signals against a preset value and then sending a true logic signal to the control logic 50. The output of the amplifier 490 is developed across a resistor 492 and is connected over the line 284 to the gate 286.

The preset value coupled to the amplifier 490 is generated by a circuit including a transistor 494 having a gate electrode connected to a resistor 396 to the gate 308. The preset voltage is adjustable by means of a potentiometer 498 in series with a resistor 500. Tied to the hold circuit between the amplifier 484 and the amplifier 488 is a clock inhibit circuit 502 including a transistor switch 504 connected to a resistor 506 and a capacitor 508 (referring to FIG. 5) through a resistor 510. This transistor switch is coupled to the output of the amplifier 484 through a resistor 512 and expands the master clock each time the ramp generator becomes active.

Also coupled to the hold circuit and actuating the level detector is a recycle timer 514 that includes an RC timing network for resetting the gain of the AGC amplifier 478. Each time the level detector becomes active, it switches a transistor 516 that in turn controls a transistor 518 to the timing circuit consisting of a capacitor 520 and an amplifier 522. The output of the amplifiers 522 controls a transistor 524 controlling a relay 526 also connected to the gate 344 by the line 528. Each time the level detector becomes active, the timer is restarted which insures the relay 526 will operate no sooner than one second after the level detector becomes inactive.

In the scan mode of the office unit 10, the receiver inhibit switch 460 is off and any frequency tone signal from the signal gate 46 is applied to the filter 466 where extraneous signals are removed. After filtering, this tone is applied to the AGC amplifier 478 where it is either amplified or attenuated and then converted to a DC voltage. This DC voltage represents the magnitude of the tone being received and is used for controlling the gain of the AGC amplifier and as a signal to the level detector including the amplifier 490. When this DC level is greater than the AGC adjust level as established by the hold circuit, the ramp generator and hold circuit function to reduce the gain of the amplifier thereby lowering the signal until it is just below the reference, thus holding it at a constant level. This action may take from 2 to 20 milliseconds depending upon the magnitude of the incoming signal. To compensate for this response time, the ramp generator enables the clock inhibit gate 502 which essentially stops the master clock and holds open the signal gate during the gain adjusting sequence of the AGC amplifier 478.

The level detector monitors the output of the rectifier diode 482 and when the DC voltage exceeds the detector adjusted level as set by the variable resitor 498, it switches to its off state and sends a signal to the control logic section and also starts the recycle timer 514. Each time a true signal is received, the timer 514 is reset and a new interval is started. If a true signal is absent for one second, the timer 514 fires and operates the relay 526 which resets the gain of the amplifier 480.

The transmitter section of the analog part of the office unit 10 includes a Colpitts oscillator with an LC tuned curcuit and a unijunction transistor 530. An inductor 532 is adjusted to the desired operating frequency of the oscillator which is controlled through a resistor 534 by a connection to the gate 348. Thus, the supply voltage for the oscillator is derived directly from the output of the gate 348 in the control logic section.

Connected to the oscillator a transmit keyer 536 which operates as a switch between the oscillator and the transmit amplifier 58. The gate 388 of the control logic controls a field effect transistor 538 and when in a saturated condition passes a signal from the oscillator 56 to the transmit amplifier 58. When the output of the gate 388 back biases the transistor 538 the transistor turns off and isolates the oscillator from the amplifier. The switch is designed to eliminate any common mode signal or pedestal in order for the output from the power amplifier to be an on/off tone burst as shown in FIG. 3.

The output of the transmit keyer 536 is applied across a gain control network including a resistor 540 in series with a potentiometer 542. The wiper arm of the potentiometer 542 is capacitor coupled to the input of the transmit amplifier 58 by means of a capacitor 544. A second input to the amplifier 58 is connected to the gate 350 of the control logic section. The output of the amplifier 58 is applied across one winding of the transmit transformer 444 coupled to the signal gates. While not explicitly shown in FIG. 6, the output line of the transformer 444 connects to each of the one hundred signal gates in the network 46.

While only one embodiment of the invention, together with modifications thereof, has been shown in detail herein and shown in the accompanying drawings, it will be evident that various further modifications are possible without departing from the scope of the invention.

What is claimed is:

1. A system for remotely identifying individual wire pairs in a multipair cable, comprising in combination:

control means electrically connected to each individual wire pair of the multipair cable for sequentially scanning the pairs for a frequency signal and generating an identifying code in response thereto; and test means electrically connected to a selected wire pair of the multipair cable, said test means comprising: means for transmitting a frequency signal over the selected wire pair to said control means, means for receiving from said control means over the selected wire pair the identifying code generated thereby, and display means for converting said identifying code into a numerical display representing the selected wire pair.

2. A system for remotely identifying individual wire pairs as set forth in claim 1 wherein said test means includes a mode sequencer for stepping the operation thereof from a ready state through a transmit mode, to a receive mode, a display mode and return to the ready state.

3. A system for remotely identifying individual wire pairs as set forth in claim 2 wherein said mode sequencer steps the test means through the receive mode to the display mode in response to receiving a complete identifying code.

4. A system for remotely identifying individual wire paris as set forth in claim 1, wherein said test means includes alarm means actuated by the identifying code to signal a variance in the polarity of the selected wire pair from a normal polarity.

5. A system for remotely identifying individual wire pairs as set forth in claim 1 wherein said identifying code comprises a plurality of bits, said means for receiving includes means for receiving identifying code bits serially from said control means, and means for interjecting timing pulses between selected groups of bits of the identifying code to distinguish separate code bit groups.

6. A system for remotely identifying individual wire pairs as set forth in claim 1 wherein said test means includes means for adjusting the test means to compensate for variations in the transmission distance from the test means to the control means.

7. A system for remotely identifying individual wire pairs as set forth in claim 1 wherein said means for transmitting produces a 15 KHz frequency signal and wherein the identifying code is transmitted at 15 KHz.

8. A system for remotely identifying individual wire pairs in a multipair cable, comprising in combination:

test means electrically connected to a selected wire pair of the multipair cable and generating a frequency tone signal, said test means displaying a numerical presentation of an identification code received over the selected wire pair; and control menas electrically connected to each individual wire pair of the multipair cable, said control means comprising: stepping means for sequentially scanning all the wire pairs in the multipair cable for the frequency signal generated by said test means, means for halting the scanning operation upon identification of a frequency signal on the selected wire pair, and means for transmitting an identifying code to said test means over the selected wire pair.

9. A system for remotely identifying individual wire pairs as set forth in claim 8 wherein said stepping means includes a level detector providing an output in response to the frequency signal on the wire pair having the highest amplitude of all wire pairs.

10. A system for remotely identifying individual wire pairs as set forth in claim 9 wherein said means for halting includes a counter with count positions equal in number to the wire pairs in the multipair cable, said counter being reset to an initial count position when the level detector responds to the frequency signal of the highest amplitude.

11. A system for remotely identifying individual wire pairs as set forth in claim 10 wherein said means for halting further includes circuitry responsive to the output of said level detector and said counter when in the highest numbered position thereof to halt the scanning operation.

12. A system for remotely identifying individual wire pairs as set forth in claim 8 wherein said means for halting includes sequencer means for advancing the operation of said control means from a transmit mode to a scan mode.

13. A system for remotely ideentifying individual wire pairs as set forth in claim 8 wherein said means for halting includes means for verifying the frequency signal on the wire pair at which the scanning operation is halted.

14. A system for remotely identifying individual wire pairs as set forth in claim 13 wherein said means for halting includes circuitry connected to said means for verifying to step the control means from a sync mode to a transmit mode.

15. A system for remotely identifying individual wire pairs as set forth in claim 9 wherein said stepping means includes a signal gate for each individual wire pair of the multipair cable having a connection to said means for transmitting and said level detector.

16. A system for remotely identifying individual wire pairs as set forth in claim 9 wherein said level detector includes a gain controlled amplifier providing an output each time a higher amplitude frequency signal is detected on a wire pair.

17. A system for remotely identifying individual wire pairs as set forth in claim 8 wherein said means for transmitting includes an oscillator generating a frequency at the same value as the test means frequency tone signal for coding into an identifying code.

18. A system for remotely identifying individual wire pairs in a multipair cable, comprising in combination:

test means electrically connected at random to a wire pair of the multipair cable, said test means comprising: means for transmitting a frequency tone signal over the individual wire pair connected to the test means, means for receiving an identifying code over the individual wire pair connected to the test means, and display means for converting said identifying code into a numerical display representing the individual wire pair connected to the test means; and control means electrically connected to each individual wire pair of the multipair cable, said control means comprising: stepping means for sequentially scanning all the wire pairs in the multipair cable for the frequency tone signal generated by said test means, means for terminating the scanning operation upon identification of a frequency signal on the individual wire pair connected to the test means, and means for transmitting the identifying code to said test means over the individual wire pair connected to the test means when the frequency signal therefrom terminates.

19. A system for remotely identifying individual wire pairs as set forth in claim 18 wherein said test means includes an alarm actuated by the identifying code to signal a variance in the polarity of the individual wire pair from a normal polarity.

20. A system for remotely identifying individual wire pairs as set forth in claim 18 wherein said test means includes means for adjusting the test means to compensate for variations in the transmission distance from the test means to the control means.

21. A system for remotely identifying individual wire pairs as set forth in claim 18 wherein said test means includes a mode sequencer for stepping the operation thereof from a ready state through a transmit mode to a receive mode, a display mode and return to a ready state.

22. A system for remotely identifying individual wire pairs as set forth in claim 18 wherein said stepping means of the control means includes a level detector providing an output in response to the frequency tone signal on the wire pair having the highest amplitude of all pairs.

23. A system for remotely identifying individual wire pairs as set forth in claim 22 wherein said means for terminating includes a counter with count positions equal in number to the wire pairs in the multipair cable, said counter being reset to an intial count position when the level detector responds to the frequency tone signal of highest amplitude.

24. A system for remotely identifying individual wire pairs as set forth in claim 23 wherein said means for terminating further includes circuitry responsive to the output of said level detector and said counter when said counter is in the highest count position to terminate the scanning operation.

25. A system for remotely identifying individual wire pairs as set forth in claim 24 wherein said means for transmitting in said test means and said control means each produces a 15 KHz frequency signal and wherein the identifying code is transmitted at 15 KHz.

26. An apparatus for identifying one of a plurality of pairs of conductors in a cable, the apparatus comprising:

a field unit having interface means for connection at random to one pair of the plurality of pairs of conductors at a first end of the cable, having transmitting means connected to the interface means for transmitting an interrogate signal via said one pair and having receiving means connected to the interface means for receiving and detecting a preassigned code identifying said one pair received via said one pair; and a control unit having interface means for connecting the control unit to a selected number of pairs of the plurality of pairs of conductors at a second end of the cable, having receiving means connected to the interface means for detecting the interrogate signal on said one pair and having transmitting means connected to the receiving means and the interface means for transmitting via said one pair the preassigned code in response to detection of the interrogate signal by the receiving means.

27. Apparatus as in claim 26 wherein the control unit receiving means includes scanning means connected to the interface means for sequentially scanning each of the selected number of pairs to search for and identify said one pair carrying the interrogate signal.

28. Apparatus as in claim 27 wherein the interrogate signal has a predetermined frequency and the control unit receiving means further includes level detecting means connected to the scanning means for detecting the signal level at the predetermined frequency on each of the selected number of pairs and for causing the scanning means to stop scanning when the scanning means is connected to the pair having the highest signal level thereon at the predetermined frequency for identifying and causing connection of said one pair to the control unit transmitting means.

29. Apparatus as in claim 28 wherein the scanning means comprises:

timing means for supplying timing signals;

counting means connected to the timing means or advancing one count in response to each timing signal; and gating means connected to the counting means, the level detecting means and the control unit interface means for sequentially gating signals on each of the selected number of pairs to the level detecting means in response to the counting means, the count in the counting means identifying the pair on which signals are being gated.

30. Apparatus as in claim 29 wherein the preassigned code represents a multidigit number identifying said one pair and the field unit receiving means includes light emitting display means for visually displaying the mulitdigit number.

31. Appparatus as in claim 29 wherein the scanning means further comprises second look counting means connected to the timing means, the counting means and the level detecting means for counting the number of timing signals received by the counting means, the second look counting means being initiated by the level detecting means in response to the detection thereby of a signal at the predetermined frequency, the second look counting means being reinitiated each time the level detecting means detects a signal on a pair at the predetermined frequency with a level higher than the level of signals at the predetermined frequency detected on previously scanned pairs, and the second look counting means halting the counting means to cause the gating means to continue gating signals on the pair being gated when the second look counting means has counted up to the selected number, thereby stopping the scanning when the scanning means is connected to the pair having the highest signal level thereon at the predetermined frequency.

32. Apparatus as in claim 28 wherein the level detecting means comprises:

a gain controlled amplifier having a signal input connected to receive signals from the scanning means and having a gain control input and a signal output;

a level detector having an input connected to the output of the gain controlled amplifier for producing at an output thereof a signal proportional to the amplitude of a signal on the signal output of the gain controlled amplifier; and gain adjusting means connected to the output of the level detector and to the gain control input for reducing the gain of the gain controlled amplifier each time the level detector detects a signal having an amplitude higher than any previously detected signal.

33. Apparatus as in claim 26 wherein the field unit includes timer means connected to the field unit transmitting means for causing termination of the transmission of the interrogate signal after a predetermined amount of time, and the control unit transmitting means transmits the preassigned code after the termination of the interrogate signal.

34. Apparatus as in claim 33 wherein pairs of conductors in the cable are used for carrying voice communications which are confined to a voice frequency band and the frequency of the interrogate signal is greater than the upper frequency limit of the voice frequency band.

35. Apparatus as in claim 33 wherein the frequency of the interrogate signal is approximately 15 kHz.

36. Apparatus as in claim 26 wherein the control unit includes electrical sensing means connected to the control unit interface means for sensing electrical quantities on said one pair and for causing the control unit transmitting means to transmit a coded signal via said one pair indicating the sensed electrical quantities, and the field unit receiving means includes processing means connected to the field unit interface means for processing the coded signal.

37. Apparatus as in claim 36 wherein the control unit electrical sensing means comprises polarity detection means for determining the polarity of said one pair at the second end of the cable, the coded signal includes a polarity code indicating the polarity of said one pair at the second end of the cable, and the field unit processing means includes polarity alarm means for giving an alarm signal to indicate a reversed polarity condition of said one pair at the second end of the cable.

38. Apparatus as in claim 26 wherein the field unit includes electrical sensing means connected to the field unit interface means for sensing electrical quantities on said one pair and for producing an output signal indicative of the sensed electrical quantities, and processing means for processing the electrical sensing means output signal.

39. Apparatus as in claim 38 wherein the field unit electrical sensing means comprises polarity detection means for determining and producing an output signal indicative of the polarity of said one pair at the first end of the cable and the processing means comprises polarity alarm means for giving an alarm signal to indicate a reversed polarity condition of said one pair at the first end of the cable in response to the polarity detection means output signal.

40. Apparatus as in claim 38 wherein the control unit includes electrical sensing means connected to the control unit interface means for sensing electrical quantities on said one pair and for causing the control unit transmitting means to transmit a coded signal via said one pair indicating the sensed electrical quantities, and the processing means includes means for detecting and processing the coded signal.

41. Apparatus as in claim 40 wherein the field unit electrical sensing means and the control unit electrical sensing means each comprise polarity detection means for determining the polarity of said one pair at the first and second ends of the cable, respectively, the field unit polarity detection means produces an output signal indicative of the polarity of said one pair at the first end of the cable, the control unit transmitting means transmits a polarity code in response to the control unit polarity detection means, and the processing means includes means for comparing the received polarity code and the field unit polarity detection means output signal and polarity alarm means for giving an alarm signal indicating the relative polarity of said one pair at the first and second ends of the cable.

42. A method for identifying one pair of a plurality of pairs of conductors in a cable comprising the steps of:

transmitting an interrogate signal via one pair of the plurality of pairs of conductors in the cable at a first end of the cable;

detecting the interrogate signal on said one pair at a second end of the cable;

transmitting via said one pair a preassigned code indentifying said one pair at the second end of the cable;

receiving the preassigned code via said one pair at the first end of the cable; and displaying the preassigned code at the first end of the cable.

43. A method as in claim 42 wherein the step of detecting the interrogate signal further includes sequentially scanning each of the plurality of pairs of conductors in the cable to find and identify said one pair.

44. A method as in claim 43 wherein the step of detecting the interrogate signal further includes comparing the signal level in a predetermined frequency range on each pair of conductors with the signal level in the predetermined frequency range on those pairs already scanned and stopping the scanning at the pair carrying the signal with the highest level in the predetermined frequency range.

45. A method as in claim 44 wherein the step of transmitting the interrogate signal is terminated after a predetermined period of time and before the step of transmitting the preassigned code.

46. A method as in claim 45 wherein the interrogate signal has a predetermined frequency within the predetermined frequency range and the step of transmitting the preassigned code includes generating a tone burst signal wherein the tone of tone bursts has substantially the same frequency as the interrogate signal.

47. A method as in claim 46 wherein:

the step of transmitting the preassigned code further includes generating a first digit signal for indicating that a first digit code follows, generating a first digit code comprising a series of tone bursts representing the first digit of the preassigned code, generating a second digit signal for indicating that a second digit code follows, generating a second digit code comprising a series of tone bursts representing the second digit of the preassigned code, generating a third digit signal for indicating that the complete preassigned code has been transmitted;

the step of receiving the preassigned code includes counting the first series of tone bursts in response to the first digit signal and counting the second series of tone bursts in response to the second digit signal; and the step of displaying the preassigned code includes visually displaying the number of first and second tone bursts counted in response to the third digit signal.

48. A method as in claim 42 wherein the step of detecting the interrogate signal includes detecting the polarity of said one pair at the second end of the cable, the step of transmitting a preassigned code includes transmitting a polarity code representing the polarity of the said one pair, the step of receiving the preassigned code includes receiving the polarity code, and the step of displaying the preassigned code includes giving an indication of the polarity of said one pair as normal or reversed.

49. A method as in claim 48 wherein:

the step of transmitting the preassigned code further includes generating a first digit signal for indicating that a first digit code follows, generating a first digit code comprising first tone bursts representing the first digit of the preassigned code, generating a second digit signal for indicating that a second digit code follows, generating a second digit code comprising second tone bursts representing the second digit of the preassigned code, generating a third digit signal for indicating that the polarity code follows, generating a third tone burst representing the polarity code; generating a fourth digit signal for indicating that the complete preassigned code has been transmitted;

the step of receiving the preassigned code includes counting the first tone bursts in response to the first digit signal, counting the second tone bursts in response to the second digit signal and detecting the third tone burst in response to the third digit signal; and the step of displaying the preassigned code includes visually displaying the number of first and second bursts counted and giving the indication of polarity in response to the fourth digit signal.

50. A system for identifying one of a plurality of channels in a multichannel cable, the apparatus comprising:

first means connected to a first end of the multichannel cable for sending a first signal on a selected channel in the multichannel cable and for receiving on the selected channel a second signal that identifies the selected channel;

second means connected to a second end of the multichannel cable for receiving the first signal on the selected channel and for sending the second signal on the selected channel in response to receipt of the first signal.

51. A system as in claim 50 wherein the second means includes scanning means connected to the second end of the multichannel cable for scanning each of the plurality of channels to locate the selected channel having the first signal thereon.

52. A system as in claim 51 wherein the second means includes level detecting means connected to the scanning means for detecting the levels of signals on each of the channels and for halting the scanning means at the channel having the highest signal level thereon.

53. A system for identifying any one of a plurality of wire pairs in a cable having a plurality of wire pairs, the system comprising:

a test apparatus connected to only one of the plurality of wire pairs and having transmitting circuit means for sending a test signal over the one wire pair and having receiving circuit means for receiving a coded signal identifying the one wire pair over the one wire pair; and a control apparatus connected to each of the wire pairs in the cable and having receiving circuit means for receiving the test signal over the one wire pair and having transmitting circuit means connected to the receiving circuit means for sending in response thereto the coded signal over the one wire pair without the use of a control wire pair, thereby eliminating the need to use an additional pair of wires in the identification of the one wire pair.

54. A system as in claim 53 wherein:

the test signal has a predetermined frequency;

the test apparatus transmitting circuit means includes a timer for terminating the sending of the test signal after a predetermined amount of time;

the control apparatus receiving circuit means comprises a gating circuit having inputs connected to each of the wire pairs in the cable and having an output, a timing circuit for producing timing pulses, a counter connected to the timing circuit for counting the timing pulses, a driver circuit connected to the gating circuit and the counter for cauusing the gating circuit to sequentially connect each of the wire pairs to the gating circuit output, a level detecting circuit connected to the gating circuit output and the counter for detecting the signal level on each wire pair and for causing the gating means to connect the one wire pair to the gating means output by causing the connection thereof to the wire pair having the highest signal level thereon at the predetermined frequency and a polarity detecting circuit connected to the gating circuit for detecting the polarity of the one wire pair;

the control apparatus transmitting circuit means comprises a code generating circuit connected to the counter, the polarity detecting circuit and the gating circuit to generate the coded signal as a sequence of tone bursts at the predetermined frequency representing the identity and polarity of the one wire pair in response to connection of the gating circuit output to the one wire pair and the termination of the test signal; and the test apparatus receiving circuit means comprises an input circuit connected to the one wire pair, a decoding circuit connected to the input circuit for receiving and decoding the sequence of tone bursts comprising the coded signal, a display circuit connected to the decoding circuit for visually displaying a code identifying the one wire pair, a polarity detecting circuit connected to the input circuit for detecting the polarity of the one wire pair, and a polarity alarm circuit connected to the polarity detecting circuit and the decoding circuit for comparing the polarity of the one pair at the test apparatus and the control apparatus and for giving a polarity alarm signal to indicate a polarity reversal between the test apparatus and the control apparatus.

55. A system for identifying one wire pair of a multiple wire pair cable comprising:

test means connected to one wire pair of the cable at a first end of the cable for transmitting an interrogate signal having a predetermined frequency over the one wire pair, for receiving a code identifying the one wire pair and for displaying the identifying code; and a control unit having interface means connected to each wire pair in the cable at a second end of the cable, having level detecting means for detecting the level of signals at the predetermined frequency, having scanning means connected to the interface means and the level detecting means for sequentially scanning the wire pairs in the cable and sequentially gating signals on each wire pair to the level detecting means, the level detecting means causing the scanning means to stop scanning and connect to the wire pair having the highest signal level thereon at the predetermined frequency to identify the one wire pair, and having transmitting means connected to the interface means and the scanning means for transmitting the code identifying the one wire pair in response to the stopping of the scanning.

56. A system as in claim 55 wherein the control unit further comprises;

timing means connected to the scanning means for supplying periodic timing signals to initiate and sequence the gating of signals on the wire pairs to the level detecting means; and counting means connected to the timing means, the scanning means and the level detecting means for counting the number of timing signals received by the scanning means, the counting means being initiated by the level detecting means in response to the detection thereby of a signal at the predetermined frequency, the counting means being reinitiated each time the level detecting means detects a signal on a pair at the predetermined frequency with a level higher than the level of signals at the predetermined frequency detected on previously scanned pairs and the counting means causing the scanning means to continue gating signals on the pair being gated when the counting means has counted up to the number of pairs in the cable, thereby stopping the scanning when the scanning means is connected to the pair having the highest signal level at the predetermined frequency thereon.

* * * * *

UNITED STATES PATENT OFFICE

CERTIFICATE OF CORRECTION

Patent No. 3,891,811 Dated June 24, 1975

Inventor(s) Arthur O. Miller

It is certified that error appears in the above-identified patent and that said Letters Patent are hereby corrected as shown below:

In the title page, column 2, penultimate line of the paragraph headed ABSTRACT, "coded" should read -- code --;

Column 2, lines 30-31, "telepone" should read -- telephone --;

Column 4, line 38, between "after" and "the" insert -- transmitting --; line 39, after "into the" insert -- receive mode to --;

Column 7, line 21, between "134" and "changes" insert -- is connected to ground through resistor 138 and --; line 24, after "to" insert -- clear --; line 31, "resitor" should read -- resistor --;

first occurrence

Column 8, line 1, after "line"/insert -- 174 --; line 17, "time" should read -- timer --; line 18, "192" should read -- 191 --; line 43, "hash" should read -- has --; line 47, before "40" insert -- decoder --; line 64, after "through" insert -- a capacitor --;

Column 10, line 29, "resistor 233 and 235" should read -- resistors 233 and 235 --; line 56, "appearig" should read -- appearing --; line 60, "canot" should read -- cannot --, and "uless" should read -- unless --; lines 63-64, "iverting" should read -- inverting --;

Column 11, line 50, "phast" should read -- phase --; line 64, "pluse" should read -- pulse --;

Column 12, line 22, "imput" should read -- input --;

UNITED STATES PATENT OFFICE
CERTIFICATE OF CORRECTION

Patent No. 3,891,811 Dated June 24, 1975

Inventor(s) Arthur O. Miller

It is certified that error appears in the above-identified patent and that said Letters Patent are hereby corrected as shown below:

Column 16, line 50, after "pair" delete "of"; line 63, "than" should read -- then --;

Column 18, line 11, "pulsed" should read -- pulse --; line 53, "an" should read -- and --;

Column 19, lines 35-36, "transmitted 58" should read -- transmitter 58 --;

Column 20, line 21, "amplifiers" should read -- amplifier --; line 29, "gate" should read -- gates --; line 50, "resitor" should read -- resistor --; line 65, after "oscillator" insert -- is --;

Column 21, line 56, "paris" should read -- pairs --; line 56, after "claim 1" delete the comma;

Column 22, line 17, "menas" should read -- means --; line 50, "ideentifying" should read -- identifying --;

Column 23, line 59, "intial" should read -- initial --;

Column 24, line 47, "or" should read -- for --;

UNITED STATES PATENT OFFICE

CERTIFICATE OF CORRECTION

Patent No. 3,891,811 Dated June 24, 1975

Inventor(s) Arthur O. Miller

It is certified that error appears in the above-identified patent and that said Letters Patent are hereby corrected as shown below:

Column 26, lines 45-46, "indentifying" should read -- identifying --;

Column 28, line 59, after "frequency" insert a comma.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*